US011467601B2

(12) United States Patent
Sørensen et al.

(10) Patent No.: US 11,467,601 B2
(45) Date of Patent: Oct. 11, 2022

(54) SELF-PROPELLED ROBOT UNIT INCLUDING A NAVIGATION SYSTEM AND MOVEMENT ITEMS FOR POSITIONING OF THE ROBOT UNIT ON AN EVEN BASE

(71) Applicant: Intelligent Marking ApS, Svenstrup J (DK)

(72) Inventors: Anders Ulrik Sørensen, Hjørring (DK); Andreas Ydesen, Hjørring (DK)

(73) Assignee: Intelligent Marking ApS, Svenstrup J (DK)

( * ) Notice: Subject to any disclaimer, the term of this patent is extended or adjusted under 35 U.S.C. 154(b) by 439 days.

(21) Appl. No.: 15/767,827

(22) PCT Filed: Sep. 28, 2016

(86) PCT No.: PCT/DK2016/050311
§ 371 (c)(1),
(2) Date: Apr. 12, 2018

(87) PCT Pub. No.: WO2017/063652
PCT Pub. Date: Apr. 20, 2017

(65) Prior Publication Data
US 2018/0307242 A1    Oct. 25, 2018

(30) Foreign Application Priority Data
Oct. 12, 2015    (DK) .......................... PA 2015 70651

(51) Int. Cl.
*G05D 1/02*    (2020.01)
*E01C 19/00*    (2006.01)
(Continued)

(52) U.S. Cl.
CPC ......... *G05D 1/0274* (2013.01); *A63C 19/065* (2013.01); *B05B 13/005* (2013.01);
(Continued)

(58) Field of Classification Search
CPC .................................................... B05B 13/005
See application file for complete search history.

(56) References Cited

U.S. PATENT DOCUMENTS 4,442,975 A     4/1984 Long et al.
7,140,555 B1 *  11/2006 Bricko .................... E01C 23/22
                                                          239/124

(Continued)

FOREIGN PATENT DOCUMENTS

AU    2012227322 A1    4/2013
DE       8713884 U     2/1988
(Continued)

OTHER PUBLICATIONS

International Search Report—PCT/DK2016/050311.
Written Opinion—PCT/DK2016/050311.
Danish Search Report for PA 2015 70651.

*Primary Examiner* — Dah-Wei D. Yuan
*Assistant Examiner* — Stephen A Kitt
(74) *Attorney, Agent, or Firm* — Schmeiser, Olsen & Watts, LLP

(57) ABSTRACT

A self-propelled robot unit including a navigation system and movement items for positioning of the robot unit on an even base and a system for impacting predefined areas of the base during the unit's movement between two points on the base is provided. The robot unit's system for impacting predefined areas of the base includes at least one effect unit provided by an outer side of the wheels in relation to the center axis, but upwards one of the driven wheels. An embodiment also relates to a method for creation of a plan for the robot unit's movements and placement of markings for a ball game field.

6 Claims, 13 Drawing Sheets

(51) Int. Cl.
    *E01C 23/22*     (2006.01)
    *B05B 13/00*     (2006.01)
    *A63C 19/06*     (2006.01)

(52) U.S. Cl.
    CPC ............ *E01C 19/004* (2013.01); *E01C 23/22* (2013.01); *E01C 23/222* (2013.01); *A63C 2019/067* (2013.01); *G05D 2201/0202* (2013.01)

(56) References Cited

U.S. PATENT DOCUMENTS

| | | | |
|---|---|---|---|
| 2004/0057795 A1* | 3/2004 | Mayfield | A63C 19/06 404/84.05 |
| 2007/0198159 A1 | 8/2007 | Durkos et al. | |
| 2009/0010712 A1 | 1/2009 | Kipfer et al. | |
| 2009/0114738 A1 | 5/2009 | Annese et al. | |
| 2009/0133515 A1* | 5/2009 | Gershtein | B05B 12/00 73/865.8 |
| 2014/0120251 A1* | 5/2014 | Grimm | B05B 13/005 427/137 |

FOREIGN PATENT DOCUMENTS

| | | |
|---|---|---|
| JP | H0871201 A | 3/1996 |
| WO | WO9531759 A1 | 11/1995 |
| WO | WO2004100044 A1 | 11/2004 |
| WO | WO2009089369 A1 | 7/2009 |

\* cited by examiner

SELF-PROPELLED ROBOT UNIT INCLUDING A NAVIGATION SYSTEM AND MOVEMENT ITEMS FOR POSITIONING OF THE ROBOT UNIT ON AN EVEN BASE

CROSS-REFERENCE TO RELATED APPLICATIONS

This application claims priority to PCT Application No. PCT/DK2016/050311 having a filing date of Sep. 28, 2016, which is based on DK Application No. PA 2015 70651, having a filing date of Oct. 12, 2015, the entire contents both of which are hereby incorporated by reference.

FIELD OF TECHNOLOGY

The following relates to a self-propelled robot unit including a navigation system and movement items for positioning of the robot unit on an even base.

BACKGROUND

A robot unit of this type is described DK patent application number PA 2014 70710, with publication date 2015 Oct. 16 and this is hereby taken as reference in its entirety.

From US application number 2009 0114738 is known a robot unit for laying down fluorescent stripes on a base, for example field stripes on a sports base such as a lawn. According to the application, the robot unit's position and orientation is known the whole time, as a result of reception of radio signals from satellites in space and via the known position and orientation, the robot unit is led around on an area and leaves markings of a fluorescent liquid, which is added to the base from a reservoir via a pump and a nozzle.

WO 9531759 A1 describes a self-propelled robot unit and a method for control of the unit, which method is suited for use by creation of a plan for markings on for example a football field. The method for control of the robot unit includes map presentation of the outdoors area on a computer screen. The user can choose/design a plan/route for the robot unit and thereby automatically also choose a point of departure for the robot. The computer generates a route for the robot unit, which is presented above the map presentation of the outdoors area and transmits the route to the robot unit.

To these known robot units is connected several shortcomings: It is difficult for ordinary people to program the unit to a specific task, the unit can have difficulty avoiding to run across, by itself, just placed coverings, there can occur problems with blockage of the nozzle, and finally it is known for certain types of marking liquids that there herein is formed sediments of pigments, such that there does not come an evenly distributed pigmentation in the submitted liquid.

SUMMARY

An aspect relates to a robot unit and hereto belonging programming system, which has high reliability, and which can be used by people without long educational background.

The aspect is achieved with a self-propelled robot unit including a navigation system and movement devices for positioning of the robot unit on an even base and a system for affecting predefined areas of the base during the unit's movement between two points on the base, since the movement devices include two individually operated wheels arranged with a mutual distance and with a joint rotational axis, which axis is perpendicular on a center axis for the self-propelled robot unit, where the center axis is coinciding with a middle normal for the two driven wheels, as stated in claim 1. This robot unit is distinctive since two non-driven wheels are arranged rotatable around each own, in horizontal plane, rotatable axis, since the non-driven wheels are placed on each own side of the center axis and separately equally far from the center axis and in distance from the driven wheels' joint axis, where the robot unit's system for affecting predefined areas of the base includes at least one effect unit provided at an outer side of the wheels in relation to the center axis, but upwards one of the driven wheels. This placement of the effect unit, which will typically include a nozzle for dosing of paint, supports in quite special degree the, for embodiments of the invention, distinctive method for programming of the robot unit and establishing of for example markings for a playing field.

It should be noted that the driven wheels can have a mutual distance, which is different from the distance between the non-driven wheels. But this difference must not be so large that the robot unit cannot be brought to run up an ordinary ramp consisting of two separate ramps. Besides the increased stability of the 4 wheels, the advantage of the applicability of that type of ramps is also of significance for the use of the unit, which hereby easily and elegantly can run both up and down from an ordinary trailer of the type, which is ordinarily tightened to a car or brought to run on similar ramps up and down stairs.

By placing the effect device next to one of the driven wheels, it becomes theoretically possible to rotate this unit about a vertical axis, by appropriate forward and/or reverse drive of the driving wheels, and thus even the smallest circles and other shapes can be formed relatively easily with this configuration.

A particularly reliable and cleaning-friendly system for handling the paint is achieved through the, in claim 2 mentioned, measures relating to hose connections and valves. In particular, it is important by establishing of football fields that there can occur a thorough mixing of the paint, as this may tend to form sediment of pigment. Also, flushing of the valve is very important for its operational reliability.

Further embodiments of the invention are stated in claims 3 and 4.

BRIEF DESCRIPTION

Some of the embodiments will be described in detail, with references to the following Figures, wherein like designations denote like members, wherein.

DETAILED DESCRIPTION

Figure 1:
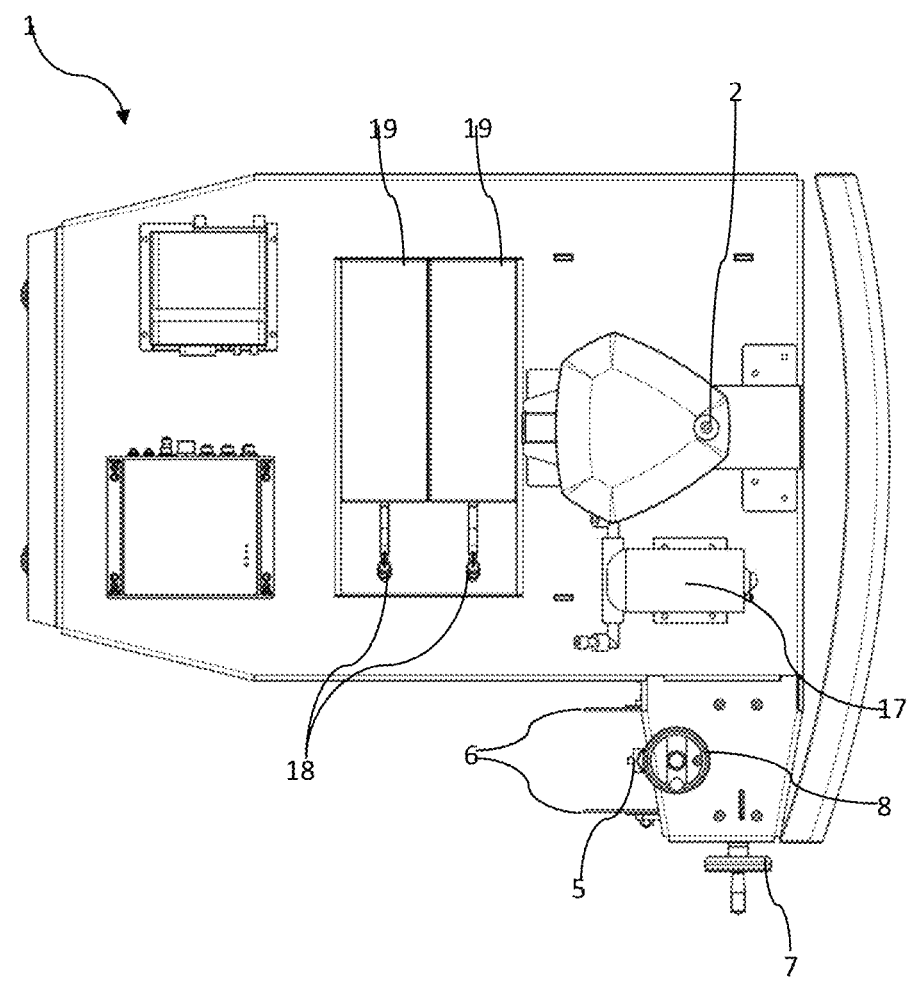
FIG. 1 shows a robot unit seen from above.
Figure 3:
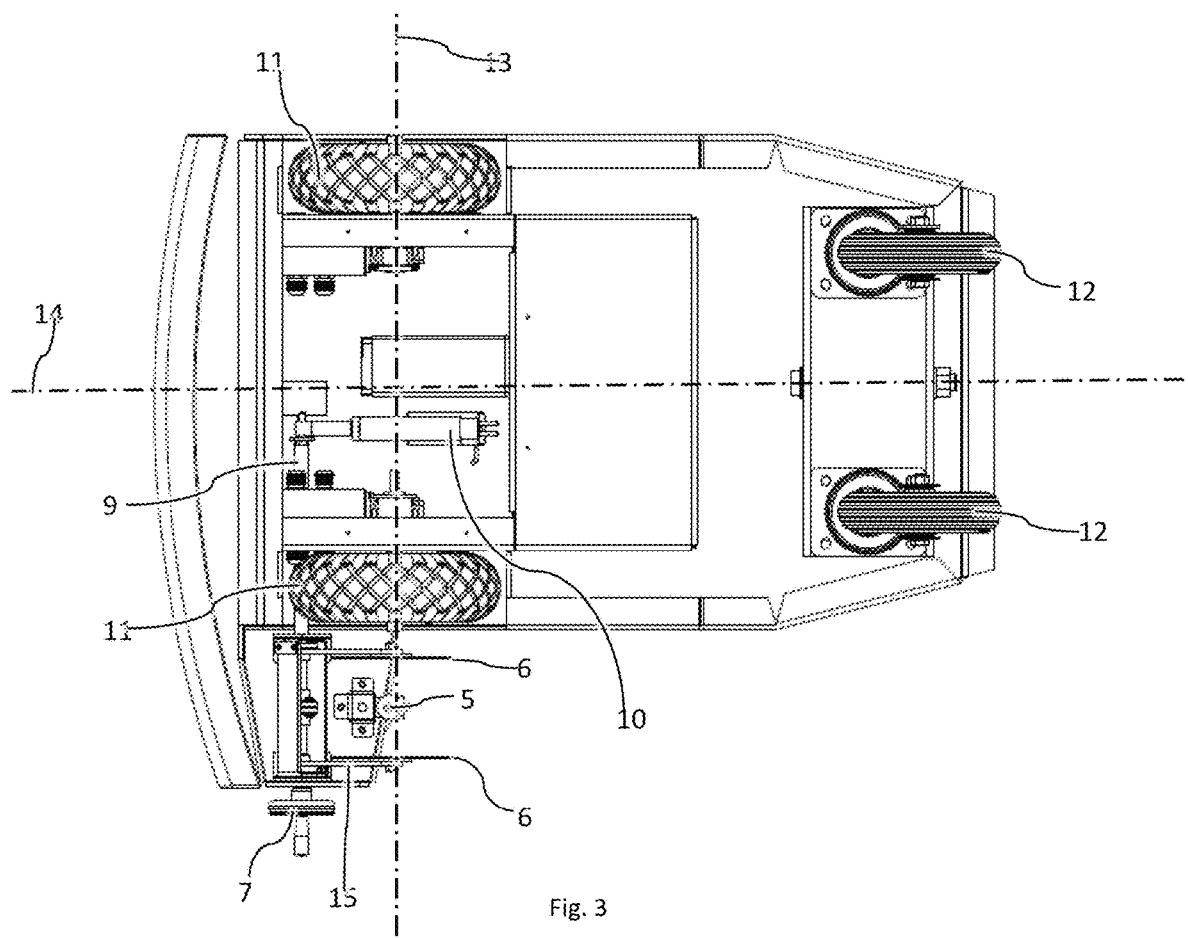
FIG. 3 shows the robot unit in FIG. 1 seen from below.

FIG. 1 shows a self-propelled robot unit 1, seen from above, and wherein is built-in a navigation system, including an antenna 2 and movement items, for example wheels consisting of two front wheels 11 and two rear wheels 12. Hereby, the robot unit 1 can be brought to position itself a predetermined place on an even base 3, for example by use of GPS or similar position determination. The robot unit also includes a system for affecting pre-defined areas of the base 3 during the unit's movement between two points on the base. It is noted that the movement items include two individually driven wheels, hereafter called front wheels 11, which are arranged with a mutual distance and with coinciding rotational axis 13. In FIG. 3, it is seen that the rotational axis 13 is perpendicular on a center axis 14 for the self-propelled robot unit where the center axis 14 is coincident with a perpendicular bisector for the mutual rotational axis for the two driven wheels 11. Two non-driven wheels, hereafter called rear wheels 12 are arranged rotatably around each own, in horizontal plane, individually rotatable axis. The propulsion then gets each rear wheel to rotate around each own horizontal axis, and since this axis by itself can rotate independently in horizontal plane, it becomes possible for the rear wheels 12, to always self-adjust separately, such that they just follow with the front wheels' propulsion direction with least possible resistance. The robot unit's propulsion direction is defined by the front wheels' mutual difference in rotational speed and direction.

As it is seen on FIG. 3, the non-driven wheels 12 are placed on respective sides of the center axis 14 and separately equally far from the center axis 14. They are also placed in distance from the driven wheels' coinciding axis 13, so the four wheels 11,12, between themselves, stretch a support surface. The robot unit's most often heaviest element, namely the reservoir 19, should then be placed by the place where the diagonals for the stretched support surface meet, which is also fulfilled here.

Figure 2:
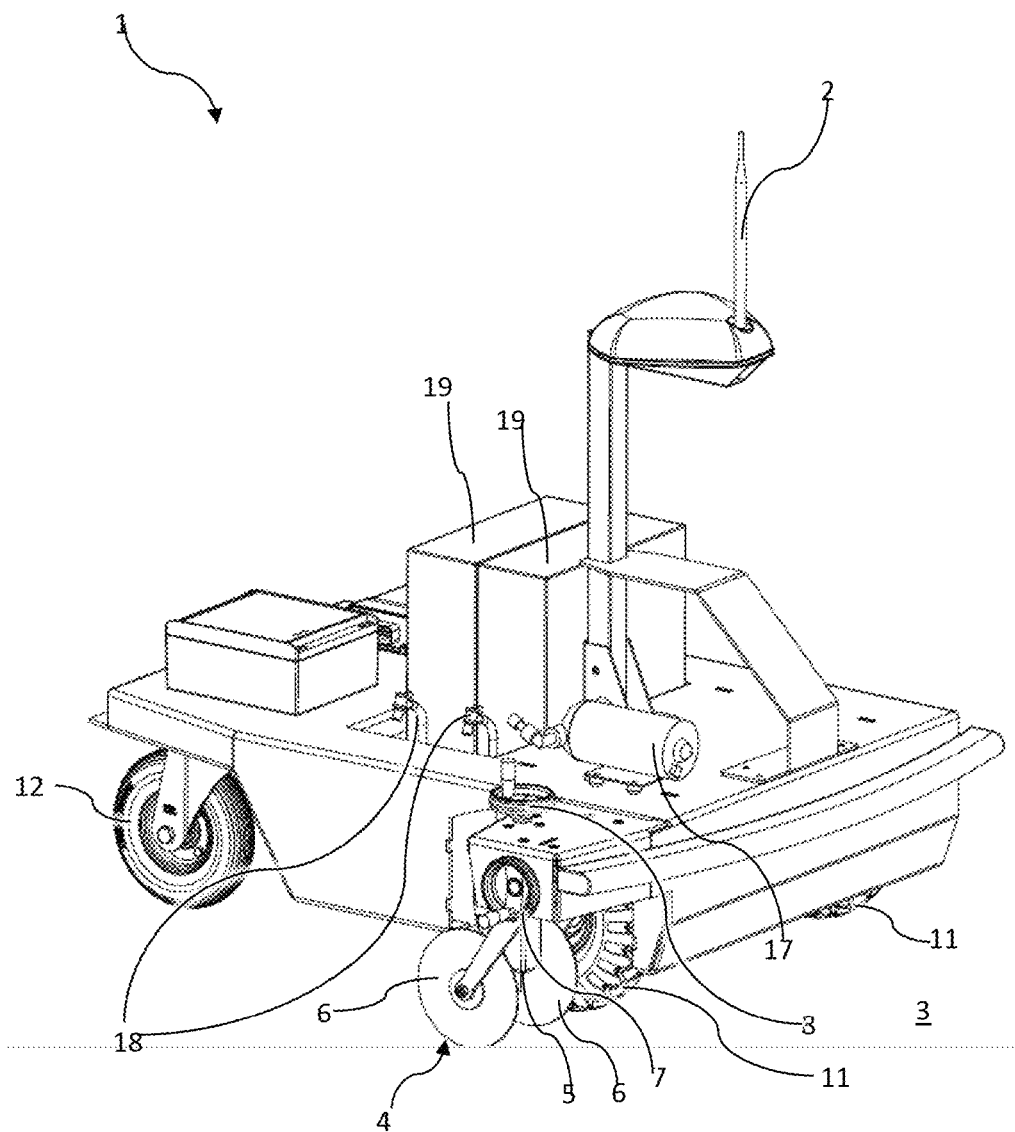
FIG. 2 shows a side perspective view of a 3D reproduction of the robot unit of FIG. 1.
Figure 13:
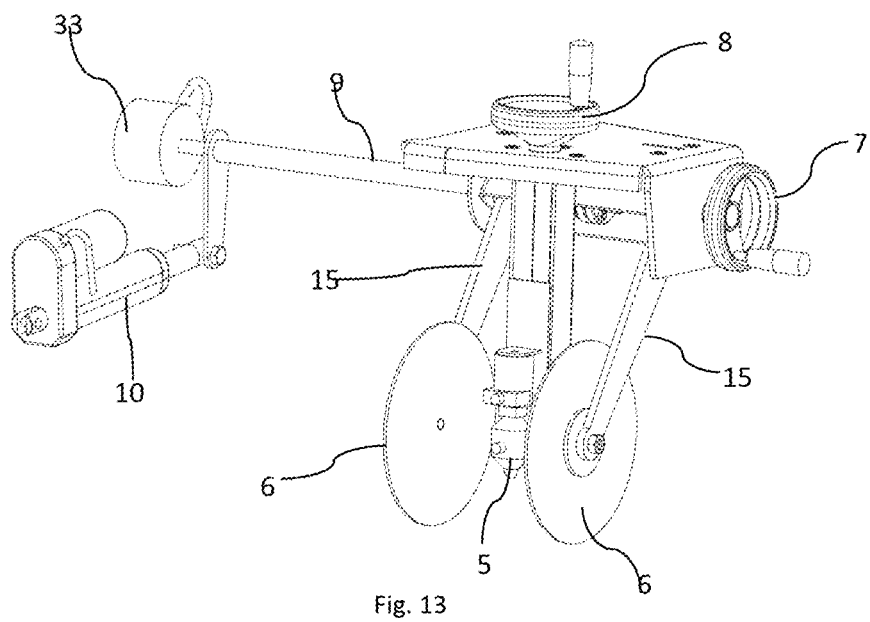
FIG. 13 shows a magnified section of an effect unit.

In FIG. 2 is seen the robot unit's system for affecting predefined areas of the base, where this includes an affecting unit 4, which is placed by an outer side of the wheels 11,12 in relation to the center axis 14, but up along one of the front wheels 11. The affecting unit includes a nozzle 5, nozzle shielding 6, height adjustment and width adjustment. This is best shown in FIG. 13. The shielding includes two disc wheels 6, which have rotational axis parallel to the rotational axis 13 for the front wheels 11 and to the disc wheels 6 belongs a system for adjusting the mutual distance of these, since an adjustment wheel 7 makes it possible and easy for the user to adjust the distance between the disc wheels 6. The disc wheels are free running and placed on respective sides of the nozzle 5 and the adjustment mechanism for the disc wheels' distance is designed such that the nozzle 5 will always be placed exactly between the disc wheels 6.

The joint rotational axis between the disc wheels and the front wheels 11, ensures that the disc wheels are never going to be moved over the surface in a direction, which deviates, from the normal to their axis of rotation. This means, on the one hand, that the axis of rotation for the disc wheels can be totally fixed and thereby on the other hand also that the disc wheels' position in relation to the vehicle is always unambiguously defined.

The plate wheels' suspension mounting 15 is designed such that the wheels 6 just rest against the base via their weight, and by individual rotatable characteristics of the fixture 15 in a vertical plane, each wheel will by itself be brought to follow the base's possible variations and rough spots. A height-adjustment wheel 8 is also positioned above the nozzle such that the nozzle's distance to the base is also adjustable depending on the base's type and quality. The plate wheels' suspension mounting 15 sits mounted on a rotatable, hollow shaft 9, which can again be turned via a joint connected actuator 10, such that the wheels 6 can be turned up and free from the base, such that they do not become damaged from fast driving, and such that they are also more easy to inspect for an operator. A motor, for example a step motor 33, is connected with the same mechanism as the adjustment wheel 7, through the hollow shaft 9 such that the robot unit also from own force, can adjust the place wheels' mutual distance and thereby the width of the piece, which becomes affected.

Figure 4:
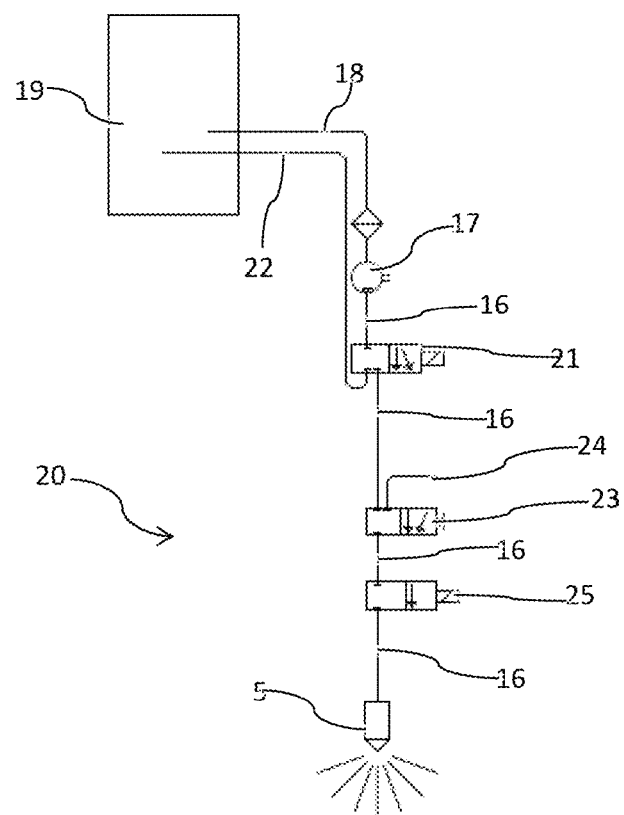
FIG. 4 is a schematic overview of a liquid transport system.

As shown in FIG. 4, the effect unit's nozzle 5 is, via a hose connection 16, in connection with a pump 17, and the pump 17 via an additional hose connection 18 is connected with a reservoir 19 for paint. In the hose connection 16 between pump 17 and the nozzle unit 5 is inserted a valve system 20, such that flushing of the nozzle 5 with flushing liquid and agitation of paint in the reservoir 19 by use of the pump 17 is made possible.

The valve system 20 thus includes an agitation valve 21 consisting of a two-placement valve in connection to the pump's pressure side. In a first position, the pump's pressure side is connected with the hose connection 16 to the nozzle 5 and the return hose 22 to the reservoir 19 is blocked. Hereby, there comes a fixed, in relation to the pump's output and rotation speed, given amount of paint to the nozzle per time unit. Especially volumetric pumps, such as peristaltic pumps, emit fixed amount of paint per rotation, which is desirable here. In another position, the pressure side of the pump connects with the return hose 22 to the reservoir 19, and the access to the hose connection 16 to the nozzle is blocked, such that the paint in the reservoir can become agitated, such that there does not occur sediments in the bottom of the reservoir, and if there should be some, the agitation can help to dissolve them.

The valve system also includes a flushing valve 23 consisting of a two-position valve, which in a first position connects the pump pressure with the nozzle 5, where the external hose connection 24 is blocked, and it is like that the flushing valve 23 is configured, when there is to occur dispensing of paint via the nozzle 4. In another position, the pressure side of the pump 17 is blocked, and an external hose connection 24 is connected to the nozzle 5, and hereby, the nozzle can be flushed by flushing liquid such as water via the external hose connection 24.

An additional stop valve 25 is provided before the nozzle 5, such that there can be closed for inflow to the nozzle 5. It ensures that there does not run or drip paint out of the nozzle 5, when the other valves are in closed position, but there is paint or flushing liquid in the hose connections. The additional stop valve's position is controlled by an electrical signal, such that it can be activated during operation in relation to the robot unit's program.

The position of the agitation valve 21 is also electrically controlled and under control of the robot unit's control system, so also here, it is the program, which decides which position 21, the valve is to be put in.

The flushing valve 23 is manually controlled and under direct control by an operator.

When the robot unit 1 must here be programmed to carry out a marking on an even base including an open outdoors area, which has not previously been marked, such that there is not any inserted program for the marking, it can appropriately occur by use of an electronic calculation and communication unit, such as a tablet, a telephone or a PC or a similar electronic unit, which includes at least one output screen. In the following walkthrough it is presumed that the screen is also an input screen, which is touch sensitive, such that the user can communicate with the unit by touching the screen with the fingers or a, to the purpose designed, pointing thing. Other forms of user input to the system can execute the shown functions.

By starting an application, hereafter called app or program, is shown the unit's status, for example "Server—Connected" and "ROS—Connected" and several others, which inform the operator that the unit is now ready for receiving input and in suiting connection with the surroundings via connection channels such as WiFi or telephone connection.

Figure 5:
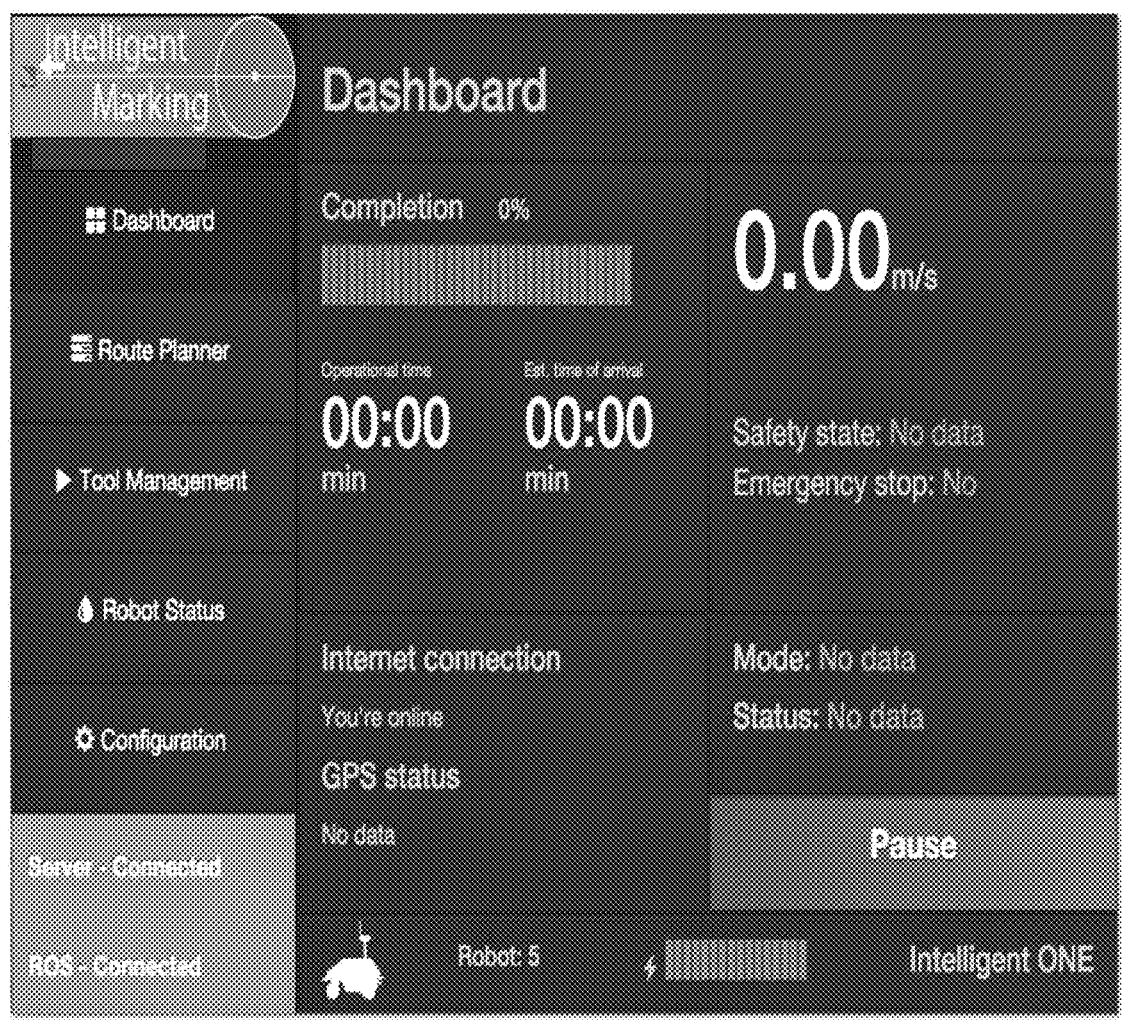
FIG. 5 is a starting image on a mobile communication and calculation unit's screen.

A list for choice of input or status functions is shown in the right side and these include "Dashboard", "Route Planner", "Tool Management", "Robot Status" and "Configuration" as shown in FIG. 5. The user can here choose "Route Planner" and gets a screen image corresponding to the one shown in FIG. 6.

Figure 6:
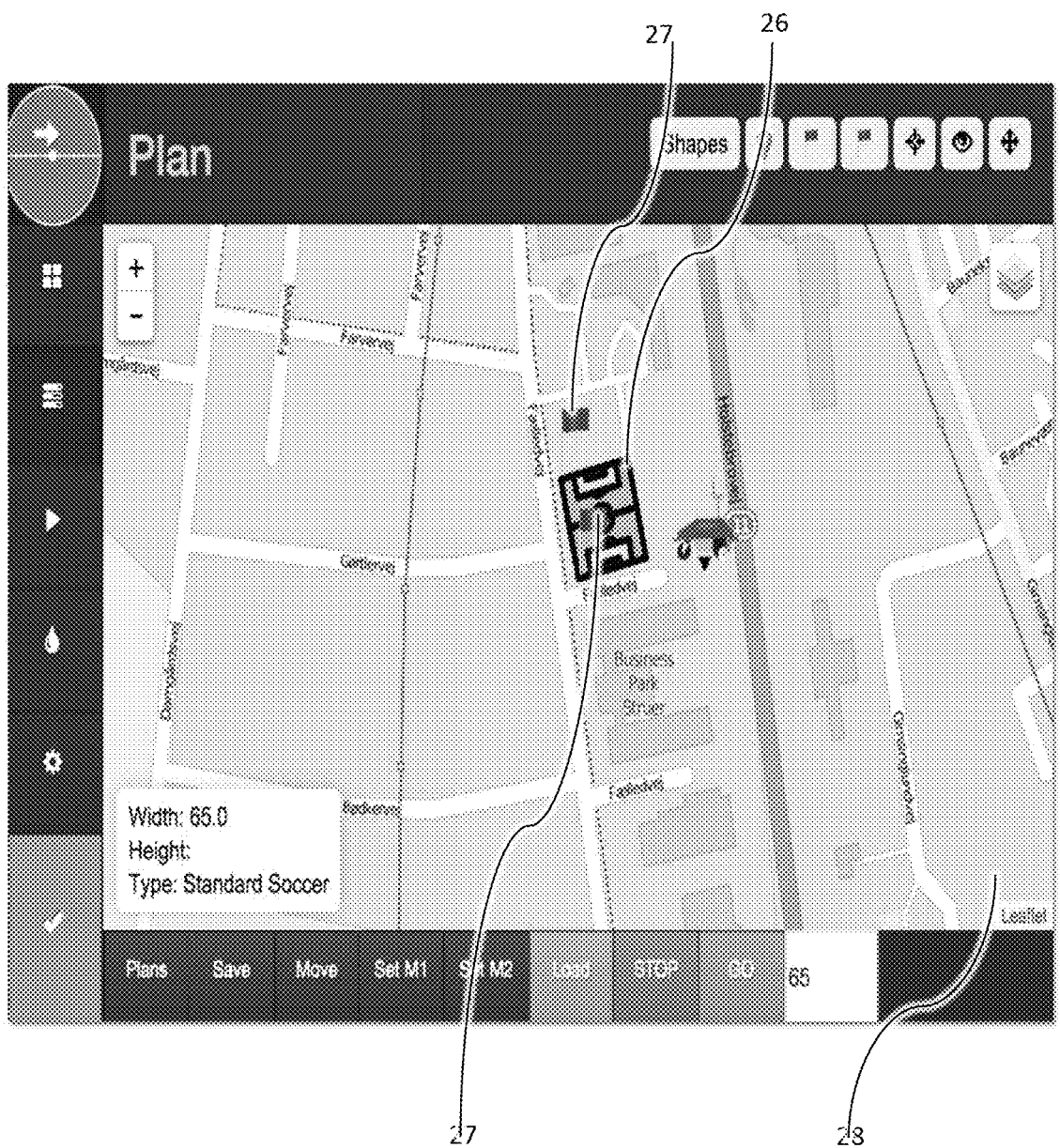
FIG. 6 shows a screen display with screen display representation of field on the map representation of sports area.
Figure 7:
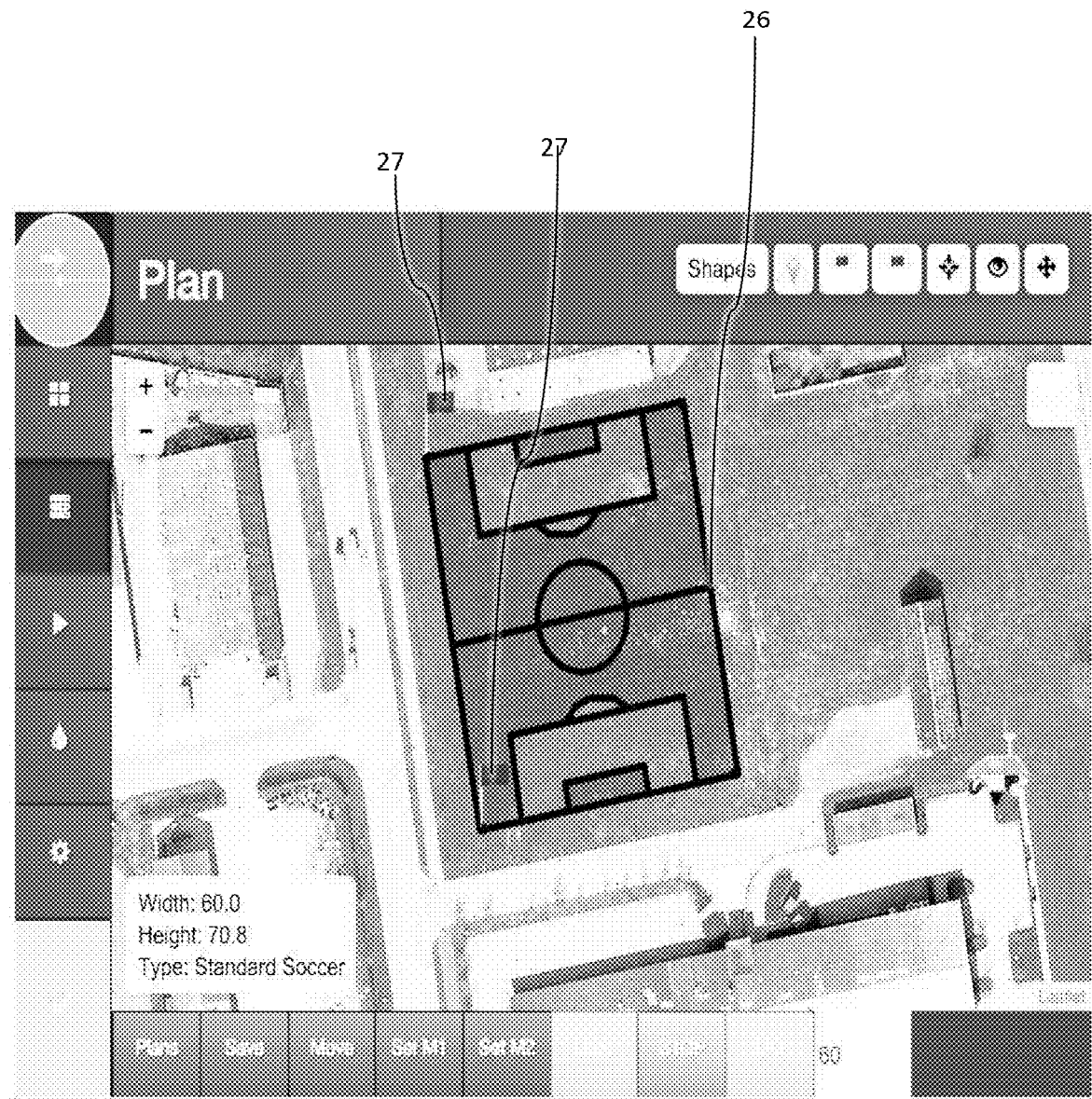
FIG. 7 shows a screen display with representation of planned field as in FIG. 6.
Figure 8:
FIG. 8 shows a screen display with input unit corresponding to a joystick.

Here is initially presented a map representation, for the open outdoors area, on the screen and the user can now choose a plan, which is desired to be marked on the base a suiting place on the shown outdoors area. There will thus, below a suiting input button, for example "shapes" as indicated in FIG. 6, be placed a number of predefined marking patterns, for example soccer field, handball court, rounders field and so forth. On the graphical map representation, the user can now choose for example the placement of a field's two corners or another fixed structure in the field, which is to be marked. If it is for example a round field with a circular outline, the center of the field, or the placement of a tangent, would be more suiting to point out, on the map representation. If there is mention of a football field, it is suiting to point out two corners' desired placement on the outdoors area. Hereafter, the application can put the field fixed out from the two corners and inform about the chosen field's length and width and if these measurements are in accordance with present rules for this type of fields. In FIGS. 6 and 7 is seen a marking plan for a football field 26 and two corner flags 27. Alternatively, the user chooses the size measurements initially, and gets a marking plan shown as a movable and rotatable object, which can be moved to a suiting place on the map, which is shown simultaneously. Here, the system must obviously scale the field, such that it is shown in natural size, in relation to the chosen view of the map.

Figure 10:
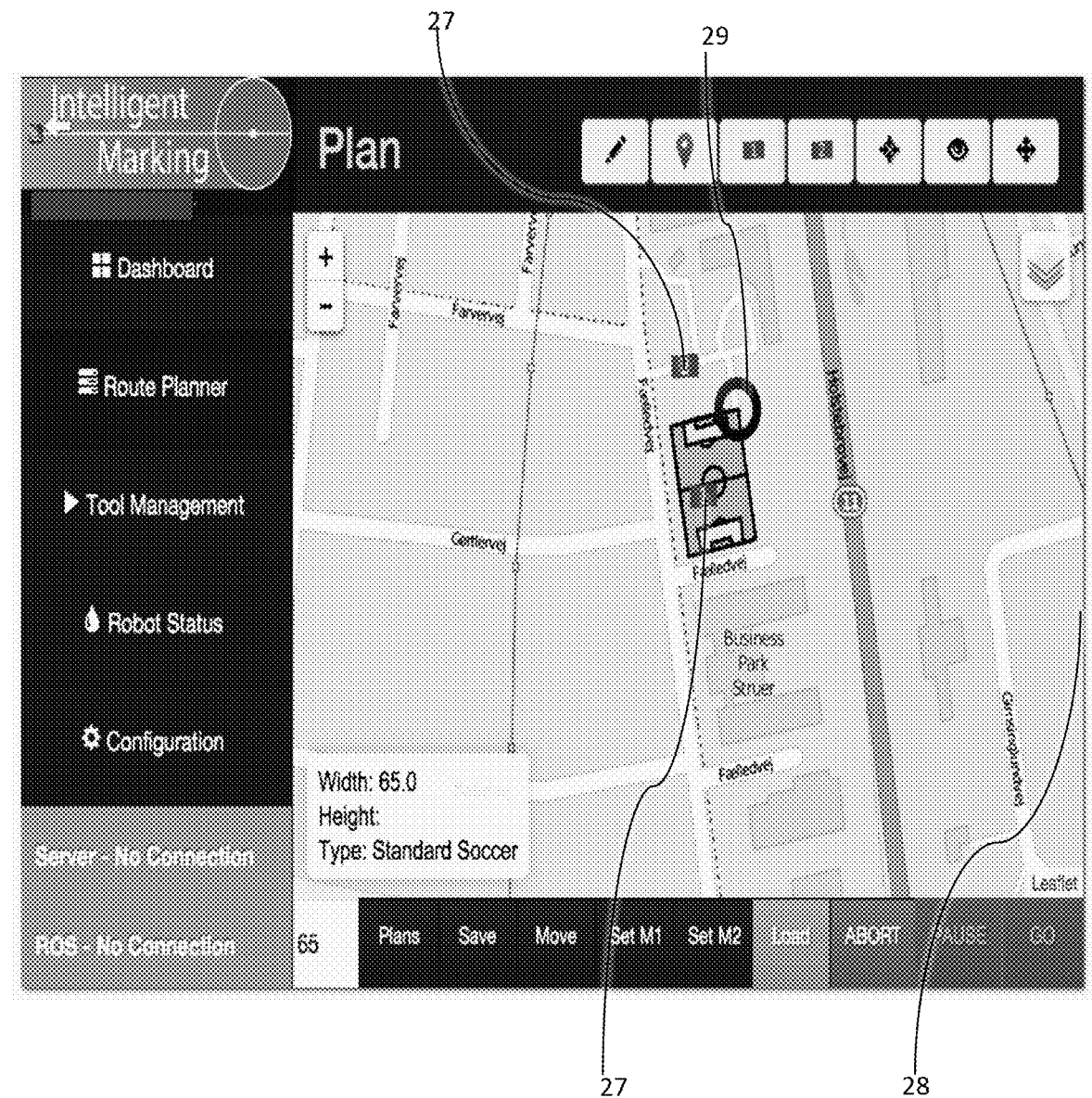
FIG. 10 shows a screen display with information to a user.
Figure 11:
FIG. 11 shows a screen display corresponding to the image in FIG. 10, but where the map is enlarged.

The shown marking plans for field 26 in FIGS. 6 and 7 are tentative and are not finally consolidated to the shown map representation of the area. As shown in FIGS. 10 and 11, there can be conflict between the chosen field and structures, which are known from the map representation of the chosen area. The circle 29 in FIGS. 10 and 11 shows such a conflict, which the user must pay regard to. Here, it can both be the case that the map shows elements, which are not found in reality, or that there are objects on the chosen area, which are not shown on the map, and which makes establishing of a football field marking impossible here. The user can move the field, or he can choose that the map representation of the area is not in accordance with reality and consolidate the marking plan 26 to the map 28, regardless the marked conflict.

Figure 9:
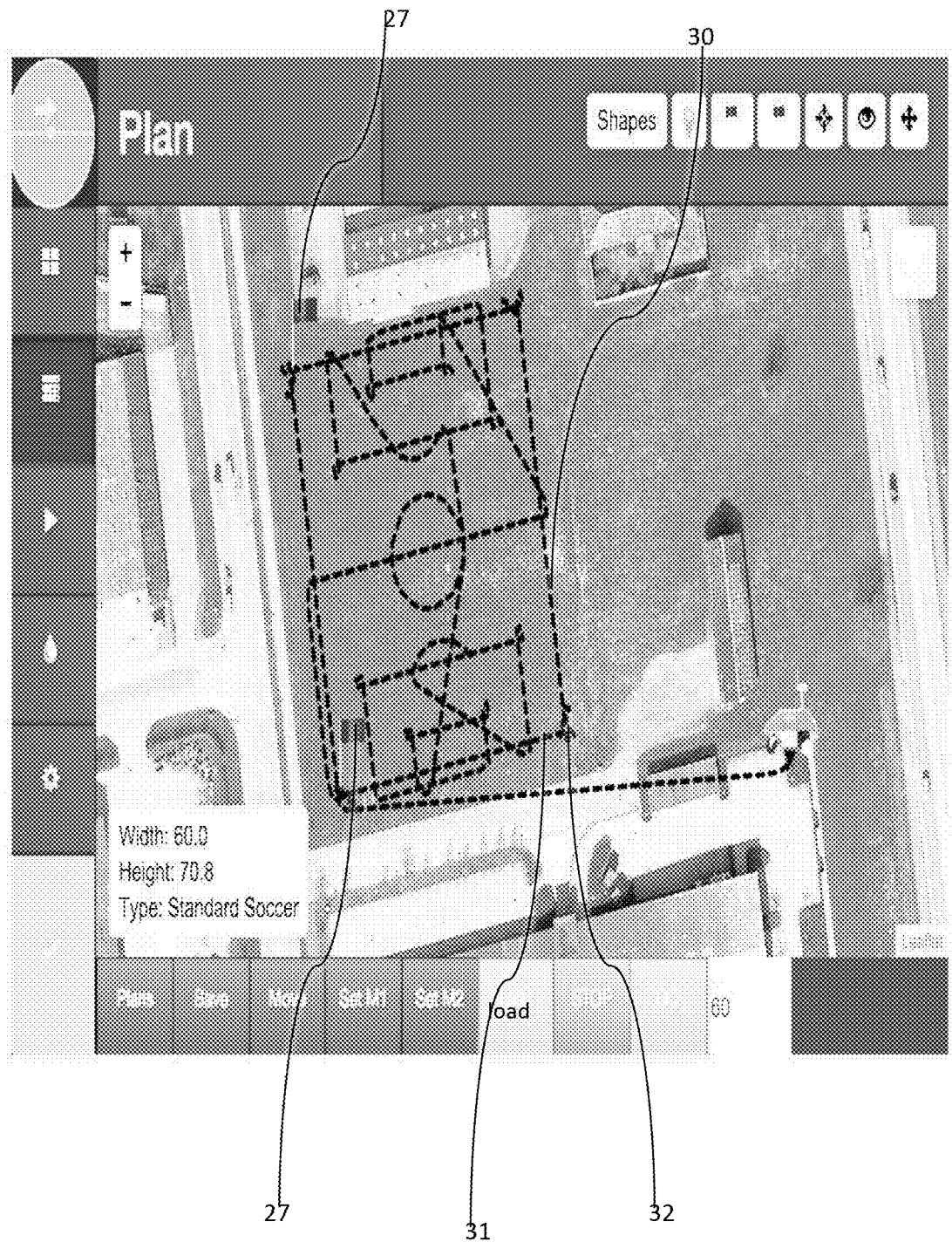
FIG. 9 shows a screen display, where the robot unit's planned route is marked.

FIG. 9 shows a consolidated marking plan 26, and the route, which the robot unit is expected to follow, by laying out of markings according to the plan. Here, the operator can have need for performing certain corrections, if a planned driving route cannot be completed. Alternatively, the robot unit can include own sensors such as cameras and via suiting logic functions, for example established through training of neural network structures, by itself navigate around objects, such as tribunes, trainer benches and others, which could be found around the field.

Figure 12:
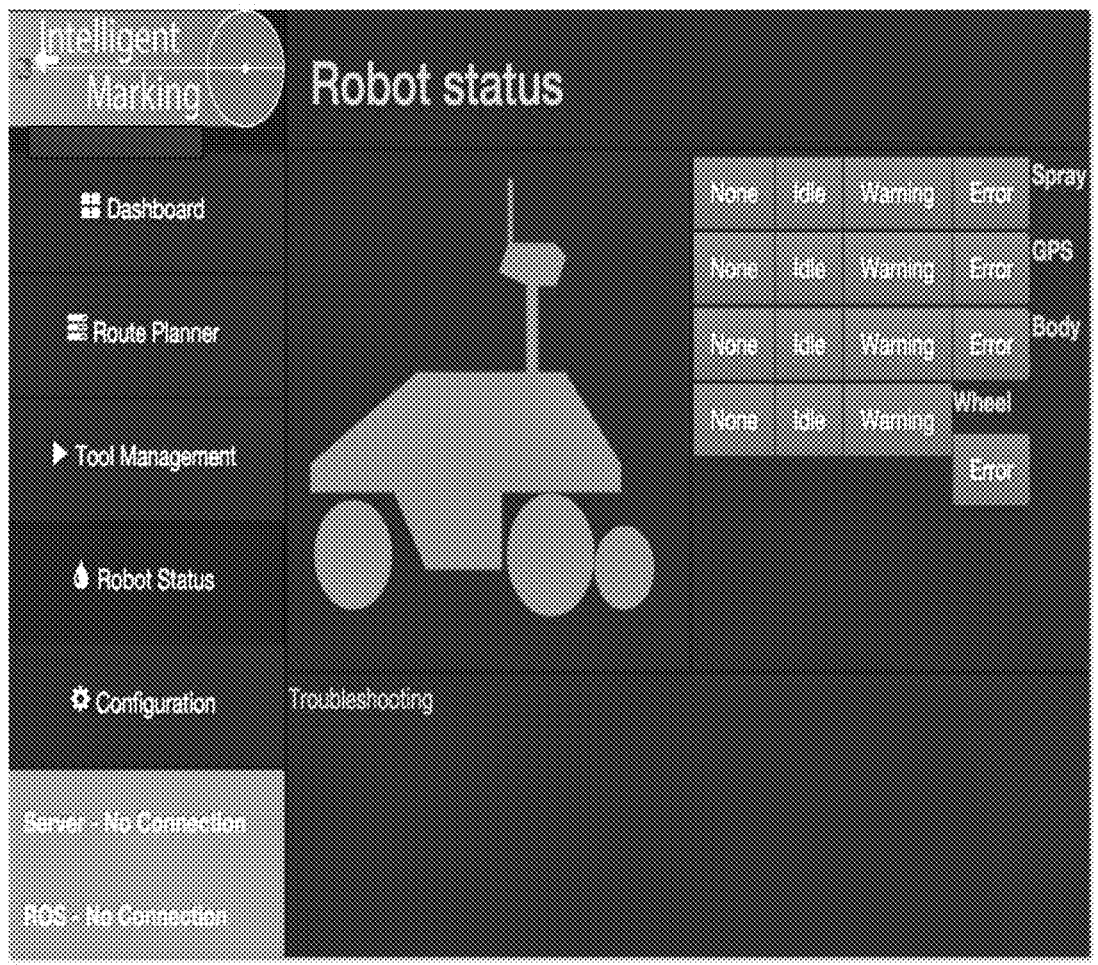
FIG. 12 shows a surveillance screen display, which is for example used when the self-propelled unit works with a marking task.

When the electronic calculation unit, after the user's approval, consolidates the plan to the map representation, it can communicate the consolidated plan to a robot unit, which can hereafter carry out the markings on the base according to the consolidated plan. During the marking, the robot unit can be in communication with the operator's calculation unit, and for example submit reports about the progression of the task or unforeseen events. In FIG. 12 is shown a status screen, as it can for example look during this task. Here is shown an error, (indicated with "Wheel Error") and a hereto belonging graphics, which indicates blocking of a wheel. It is now up to the operator to decide how the problem is solved. If the robot unit has its own camera system, this could be used and pictures of the situation could be streamed to the electronic unit. The robot unit can also bring along its own winged camera drone, for example a helicopter drone, which the operator, from his position another place, can bring into use and try to determine the reason for the error message. Finally, the operator can search for the unit and here try to solve the problem by suiting procedure.

This, for embodiments of the invention distinctive, app can be used for robot units of other types than the one described here, in cases where there is to be determined a marking pattern, which must subsequently be put down on an even base. It will for example be possible to use this app for, for example, planning of a robot assisted laying down of road lines or lines on a parking facility for vehicles. The robot unit itself can also be used for this task, however, it should be noted that the effect unit must contain another type of nozzle or equipment for putting on road lines. For example, at temporary traffic adjustments or by marking for use at establishing of actual road lines, it will be natural to use a smaller self-propelled robot unit and an app for planning the task, of the same type and size as described here. Actual road lines, of the type, which is used today, would require a larger robot unit with for example heat source for heating of the line material before, during or after the application, but all the shown principles for both programming and placement of the effect unit can find use also within heavier material.

Another field of application for the robot unit and the app is green painting of discontinued lawns. This is normal in regions where droughts are often occurring and where sprinkling water is costly. California and Arizona consist such areas, where it is seen as important that lawn grass has a fresh green look, also during drought periods, where the grass naturally otherwise looks brown and burned off. Here is not only put on lines, but the whole lawn surface is painted with green paint, so a somewhat wider effect unit must be expected to be required.

When the self-propelled robot unit must carry out its task with marking a field, it occurs by following this procedure:
  a. the self-propelled robot unit 1 follows the predefined driving route 26 on the surface by independent propulsion of the two juxtaposed driving wheels 11 against the surface,
  b. paint is released to the surface since the paint is tapped from a reservoir 19 on the robot unit 1,
  c. the paint is applied in a, to the robot unit 1, belonging area with a predefined width across the driving direction externally in relation to one of the two juxtaposed driven wheels 11.

It is especially section c, which is crucial for the robot unit's performance, because by adding the paint in this way, it becomes easy to avoid that the unit's wheels move on top of, only just, dispensed paint.

If there are goalposts on the field and there is to be established a marking really close to the post, the robot unit has a simple algorithm for ensuring this task, since the nozzle initially is driven fully towards the post, whereafter the marking is established during movement away from the post.

At the planning of the robot unit's 1 route for getting established the markings on the surface, it is preferred that the robot unit 1 creates internal markings on the football field and ends with formation of the outermost placed markings and such that outermost placed markings are formed without the football field's area itself being touched by the robot unit's wheels. This is especially easy to carry out since the robot unit's effect unit, or area for adding paint, is mounted outermost in relation to the driven wheels 11.

During the execution of the task with creation of the sports field's markings, there must for example be formed lines, which meet each other in an angle including leg one 30 and leg two 31, such as for example a right angle in a corner of a football or handball court, as shown in FIG. 9. Here, it has been found to be appropriate that the formation of such an angle occurs by leg one 30 being created during the robot unit's propulsion forwards towards the meeting point 32 for the two legs and simultaneous dispensing of paint, and that the robot unit 1 continues the propulsion past the meeting point 32 and stops dispensing of paint when the robot unit's area for adding of paint or the nozzle 5 cross past the meeting point 32, and that the robot unit 1 hereafter makes a turn outside the two legs without dispensing paint, such that the second leg 31 can be formed in one driving direction away from the meeting point 32 for the two legs since dispensing of paint is initiated since the robot unit's area for adding paint or the nozzle 5 crosses past the meeting point 32. In this way is achieved a sharp marking of the angle.

The robot unit is provided with a software based IMU-GNSS stabilizing function, which continuously, in real time, corrects for the unwanted movements of the GNSS-antenna mast 2, which is caused by the robot unit's tilt or roll because of an uneven surface. The surface is above stated as "even" but this is a relative term, and especially outdoors surfaces can have irregularities in larger or smaller extent, and these can act distracting on determination of the real position of the effect unit, unless this is taken into account. The software function is implemented by use of data from the robot unit's IMU, which continuously supplies data about the robot unit's angle related position in relation to horizontal. This angle is continuously measured and on this basis and the GNSS antenna's height, there is calculated an offset vector, which is continuously deducted in relation to the likewise continuously read GNSS position. The deduction ensures that the compensated GNSS position is precise and not, or only in limited extent, affected by the robot unit's tilt or roll. The compensation is also taken into account, in connection with the auto control software's adjustment of movement direction and the speed of the two pulling wheels on the robot. Hereby is achieved a more precise positioning of effect area in relation to the surface, and thereby a more precise marking of the football field.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

REFERENCE NUMBERS

1 Self-propelled robot unit,
2 Antenna
3 Surface
4 Effect unit
5 Nozzle
6 Disc wheel
7 Adjustment wheel
8 Height adjustment wheel
9 Rotatable shaft
10 Actuator
11 Front wheel
12 Rear wheel
13 Axis of rotation
14 Center axis
15 The disc wheels' suspension mounting
16 Hose connection,
17 Pump,
18 Additional hose connection
19 Reservoir
20 Valve system
21 Agitation valve
22 Return hose
23 Flushing valve
24 External hose connection
25 Stop valve
26 Marking plan for football field
27 Corner posts
28 Map representation
29 Collision
30 Leg one
31 Leg two
32 The meeting point
33 Step motor

The invention claimed is:

1. A self-propelled and self-controlled robot unit, comprising:
  a navigation system comprising a global navigation satellite system (GNSS) antenna mast and an inertial measurement unit (IMU),
  movement items for positioning the self-propelled and self-controlled robot unit on a base by the self-propelled and self-controlled robot unit itself, wherein the movement items comprise two individually operated wheels arranged with a mutual distance and with joint rotational axis, wherein the joint rotational axis is perpendicular to a center axis for the self-propelled robot unit, wherein the center axis coincides with a middle normal for the two individually operated wheels, two non-driven wheels each arranged independently and freely rotatable around respective horizontal rotatable axes and vertical rotatable axes, wherein the non-driven wheels are each placed on a side of the center axis and separately equally far from the center axis and in distance from the individually operated wheels' joint rotational axis, and a system for affecting predefined areas of the base, the system for affecting predefined areas of the base including at least one effect unit provided at an outer side of one of the two individually operated wheels in relation to the center axis, wherein the self-propelled and self-controlled robot unit is configured to position itself in a predetermined place on the base by use of a GNSS position determination, wherein the system controls the at least one effect unit when affecting predefined areas of the base, according to a number of predefined marking patterns, and the self-propelled and self-controlled unit is configured to follow the predefined marking patterns when laying out markings wherein the self-propelled and self-controlled robot unit is configured with an IMU-GNSS stabilizing function, which continuously, in real time, corrects for the unwanted tilt or roll movements of the self-propelled and self-controlled robot unit based on the robot unit's angle related position in relation to horizontal and a height of the GNSS antenna mast, by adjusting movement direction and speed of the two individually operated wheels.

2. The self-propelled and self-controlled robot unit, as stated in claim 1, wherein the effect unit is designed with at least one nozzle, which via a hose connection, is in connection with a pump, wherein the pump via an additional hose connection is connected with a reservoir for paint, wherein in the hose connection between pump and the nozzle is inserted a valve system, such that flushing of the nozzle with flushing liquid and agitation of paint in the reservoir by use of the pump is made possible.

3. The self-propelled and self-controlled robot unit, as stated in claim 2, wherein the valve system includes an agitation valve consisting of a valve in connection to the pump's pressure side, which in a first position connects the pump's pressure side with the hose connection to the nozzle and blocks a return hose to the reservoir, and in a second position connects the pressure side of the pump with the return hose to the reservoir and blocks the access to the hose connection.

4. The self-propelled and self-controlled robot unit, as stated in claim 3, wherein the valve system additionally includes a flushing valve consisting of a valve, which in a first position connects the pump pressure side with the nozzle and blocks an external hose connection, and which in a second position blocks the pressure side of the pump and connects the external hose connection to the nozzle, whereby the nozzle can be flushed by flushing liquid via the external hose connection.

5. The self-propelled and self-controlled robot unit, according to claim 4, wherein the position of the agitation valve is electrically controlled by the system, and the flushing valve is manually controlled by an operator.

6. The self-propelled and self-controlled robot unit, as stated in claim 1, wherein the effect unit comprises a spraying nozzle and a nozzle shielding comprising two disc wheels arranged on respective sides of the spraying nozzle and an adjustment wheel configured for the user to adjust the distance between the two disc wheels, configured such that the spraying nozzle will always be placed exactly between the disc wheels.

* * * * *